United States Patent [19]
Okcuoglu

[11] Patent Number: 5,964,126
[45] Date of Patent: Oct. 12, 1999

[54] HYDRAULIC COUPLING FOR AUXILIARY DRIVE AXLE OF A VEHICLE DRIVETRAIN

[75] Inventor: Murat N. Okcuoglu, Santa Barbara, Calif.

[73] Assignee: McLaren Automotive Group, Inc., Santa Barbara, Calif.

[21] Appl. No.: 09/145,846

[22] Filed: Sep. 2, 1998

[51] Int. Cl.⁶ ..................................................... F16H 48/00
[52] U.S. Cl. ........................................................... 74/650
[58] Field of Search ................................................ 74/650

[56] References Cited

U.S. PATENT DOCUMENTS

| | | | |
|---|---|---|---|
| 4,681,180 | 7/1987 | Oyama et al. | 74/650 |
| 4,730,514 | 3/1988 | Shikata et al. | |
| 4,960,011 | 10/1990 | Asano | 74/650 |
| 5,189,930 | 3/1993 | Kameda | 74/650 |
| 5,310,388 | 5/1994 | Okcuoglu et al. | |
| 5,536,215 | 7/1996 | Shaffer et al. | |
| 5,595,214 | 1/1997 | Shaffer et al. | |
| 5,735,764 | 4/1998 | Shaffer et al. | |

*Primary Examiner*—Dirk Wright
*Attorney, Agent, or Firm*—Brooks & Kushman P.C.

[57] ABSTRACT

A hydraulic coupling (38) for coupling a casing (46) and a pair of axle half shafts (40) of an auxiliary drive axle (36) of a vehicle drivetrain (22) includes a housing (44) for containing hydraulic fluid and the casing (44) rotatively mounted within the housing. A clutch (76) extends between the casing (46) and each of the axle half shafts (40) and is actuable to transfer torque therebetween by the operation of a pair of hydraulic pumps (90) that provide pumped hydraulic fluid to a pair of piston chambers (110) whose pistons (120) actuate the clutch. An outlet port (122) of each piston chamber (110) and an associated temperature compensated valve (124) and a pressure relief valve (126) of each piston chamber control the clutch actuation.

10 Claims, 7 Drawing Sheets

5,964,126

HYDRAULIC COUPLING FOR AUXILIARY DRIVE AXLE OF A VEHICLE DRIVETRAIN

TECHNICAL FIELD

This invention relates to a hydraulic coupling for coupling a pair of axle half shafts of an auxiliary drive axle of a vehicle drivetrain.

BACKGROUND ART

One type of vehicle drivetrain includes a main drive axle and an auxiliary drive axle that is connected to the main drive axle to provide driving upon slippage of the main drive axle. Hydraulic couplings have previously utilized Gerotor-type pumps in association with a clutch as disclosed by U.S. Pat. Nos. 5,310,388 Okcuoglu et al.; 5,536,215 Shaffer et al.; 5,595,214 Shaffer et al.; and 5,735,764 Shaffer et al. These prior hydraulic couplings include a valve that closes upon differential rotation of a pair of axle half shafts to provide piston-actuated clutch actuation while permitting a certain amount of hydraulic bleed flow.

U.S. Pat. No. 4,730,514 Shikata et al. discloses a differential mechanism wherein a hydraulic pump controls operation of a clutch and a bevel gear-type planetary gear set that extend between two rotary members such that a limited slip function of the differential gear set is provided, and there is also a relief valve that opens to suppress pressure.

DISCLOSURE OF INVENTION

An object of the present invention is to provide an improved hydraulic coupling for coupling a pair of axle half shafts of an auxiliary drive axle of a vehicle drivetrain with a main drive axle through a connecting shaft extending between the auxiliary and main drive axles.

In carrying out the above object, the hydraulic coupling of the invention includes a housing for containing hydraulic fluid and includes a casing rotatively mounted within the housing and rotatively driven by the main axle through the connecting shaft. The casing has a pair of openings through which the pair of axle half shafts respectively project into the casing, and the casing also includes a pair of fluid inlets respectively adjacent the pair of openings. A clutch extends between the casing and each of the axle half shafts within the casing and is actuable to transfer torque between the casing and each of the pair of axle half shafts. A pair of hydraulic pumps of the coupling are located within the casing respectively adjacent the pair of fluid inlets with the clutch located between the pair of pumps. Each pump includes an impeller that has external teeth and also has a spline connection to an associated one of the axle half shafts. Each pump also has an internal ring gear mounted for rotation eccentrically with respect to the impeller and including internal teeth meshed with the external teeth of the impeller. The impeller has one less tooth than the ring gear to provide a rotational pumping of hydraulic fluid into the casing through the adjacent inlet upon relative rotation between the casing and each of the pair of axle half shafts. A pair of piston chambers are defined within the casing and respectively located on opposite sides of the clutch to receive hydraulic fluid pumped from the pair of pumps. A pair of pistons are respectively located within the pair of piston chambers and are movable by pumped hydraulic fluid to actuate the clutch and transfer torque between the casing and at least one of the axle half shafts. Each piston chamber includes an outlet port having a flow area through which the pumped hydraulic fluid flows. Each outlet port has a temperature compensated valve that decreases the flow area of the outlet port upon increasing temperature and that increases the flow area of the outlet port upon decreasing temperature to control the flow of pumped hydraulic fluid from the associated piston chamber and thereby control the torque transfer between the casing and at least one of the axle half shafts.

In the preferred construction of the hydraulic coupling, each outlet port extends through the associated piston on which the associated temperature compensated valve is mounted. Each of the outlet ports has a teardrop shape, and each temperature compensated valve has a bimetallic spring and a valve element that is rotatively moved by the bimetallic spring in response to temperature changes. A teardrop-shaped opening of each valve element is moved with respect to the associated outlet port to control the flow area of the outlet port and thus the flow of pumped hydraulic fluid through the outlet.

In one construction, a pair of pressure relief valves of the coupling respectively limit the hydraulic fluid pressure within the pair of piston chambers. Each pressure relief valve includes a pressure relief port that extends through the associated piston, and each pressure relief valve includes a valve element mounted on the associated piston for movement between closed and open positions. The valve element of each pressure relief valve preferably is constructed as an elongated valve element having one end mounted by the associated piston and having a distal end that closes the pressure relief port until an excessive pressure is reached in the associated piston chamber whereupon the valve element moves to the open position to open the pressure relief valve.

The pressure relieve valves can be constructed to relieve pressure progressively and to include a bimetallic valve element that relieves the pressure in a progressive manner that is temperature compensated. The pressure relief valves can also be constructed to relieve pressure with a snap action and hysteresis.

The objects, features and advantages of the present invention are readily apparent from the following detailed description of the best modes for carrying out the invention when taken in connection with the accompanying drawings.

BEST MODES FOR CARRYING OUT THE INVENTION

Figure 1:
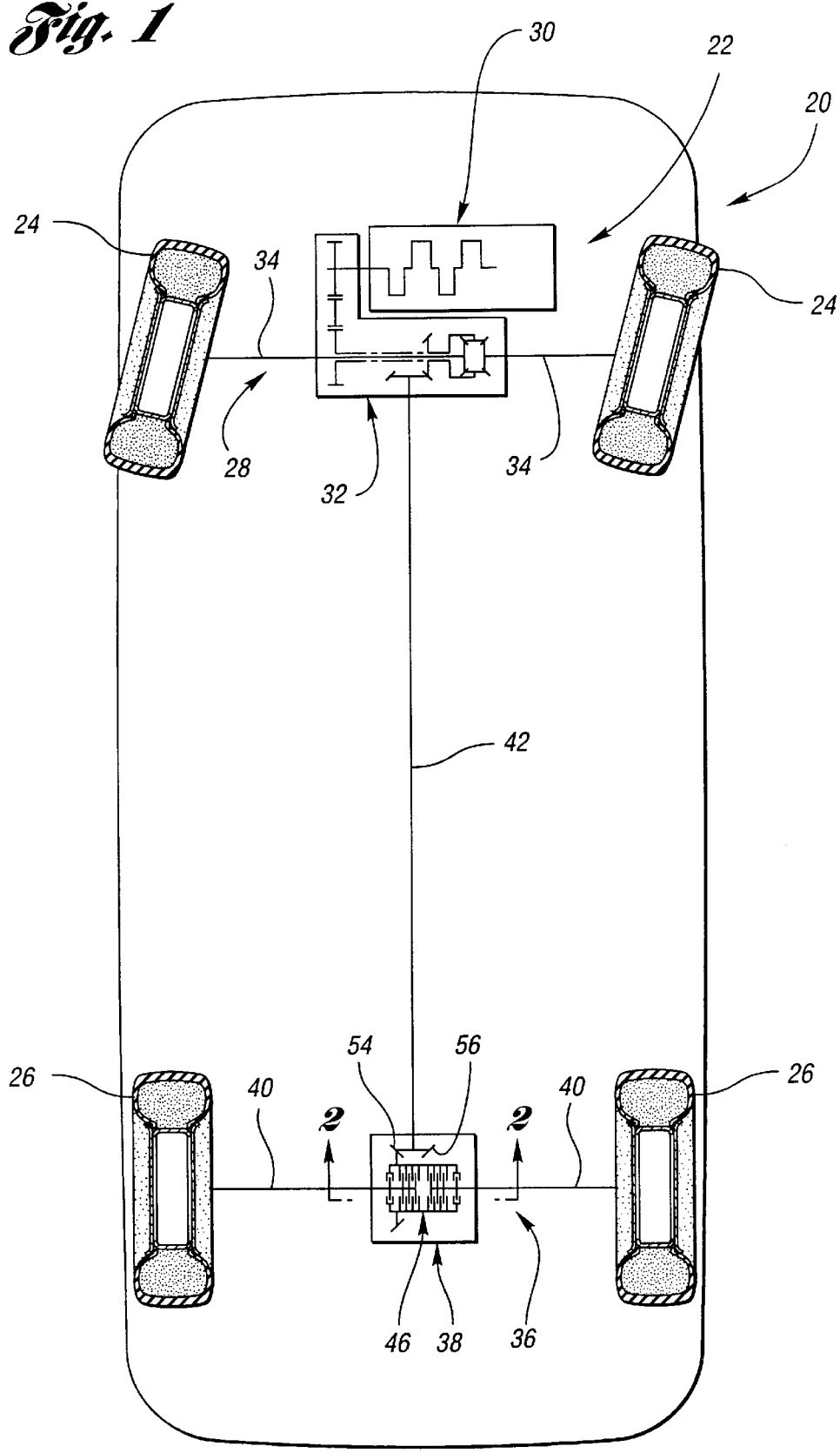
FIG. 1 is a schematic top plan view of a vehicle having a drivetrain that includes an auxiliary axle having a hydraulic coupling constructed in accordance with the present invention for coupling a pair of axle half shafts.

With reference to FIG. 1 of the drawings, a schematically illustrated vehicle 20 includes a drivetrain generally indicated by 22 for driving the vehicle front and back wheels 24 and 26 as is hereinafter more fully described. The front main drive axle 28 is driven by a schematically illustrated engine 30 through a transaxle 32 and includes axle half shafts 34 that respectively drive the left and right front wheels. A rear auxiliary drive axle 36 includes a hydraulic coupling 38 that is constructed in accordance with the present invention as is hereinafter more fully described to provide torque transfer to the left and right axle half shafts 40. A connecting shaft 42 of the drivetrain extends between the front main drive axle 28 and the rear auxiliary drive axle 36 to provide rotary driving thereof and torque transfer to the axle half shafts as needed such as during slippage.

Figure 2:
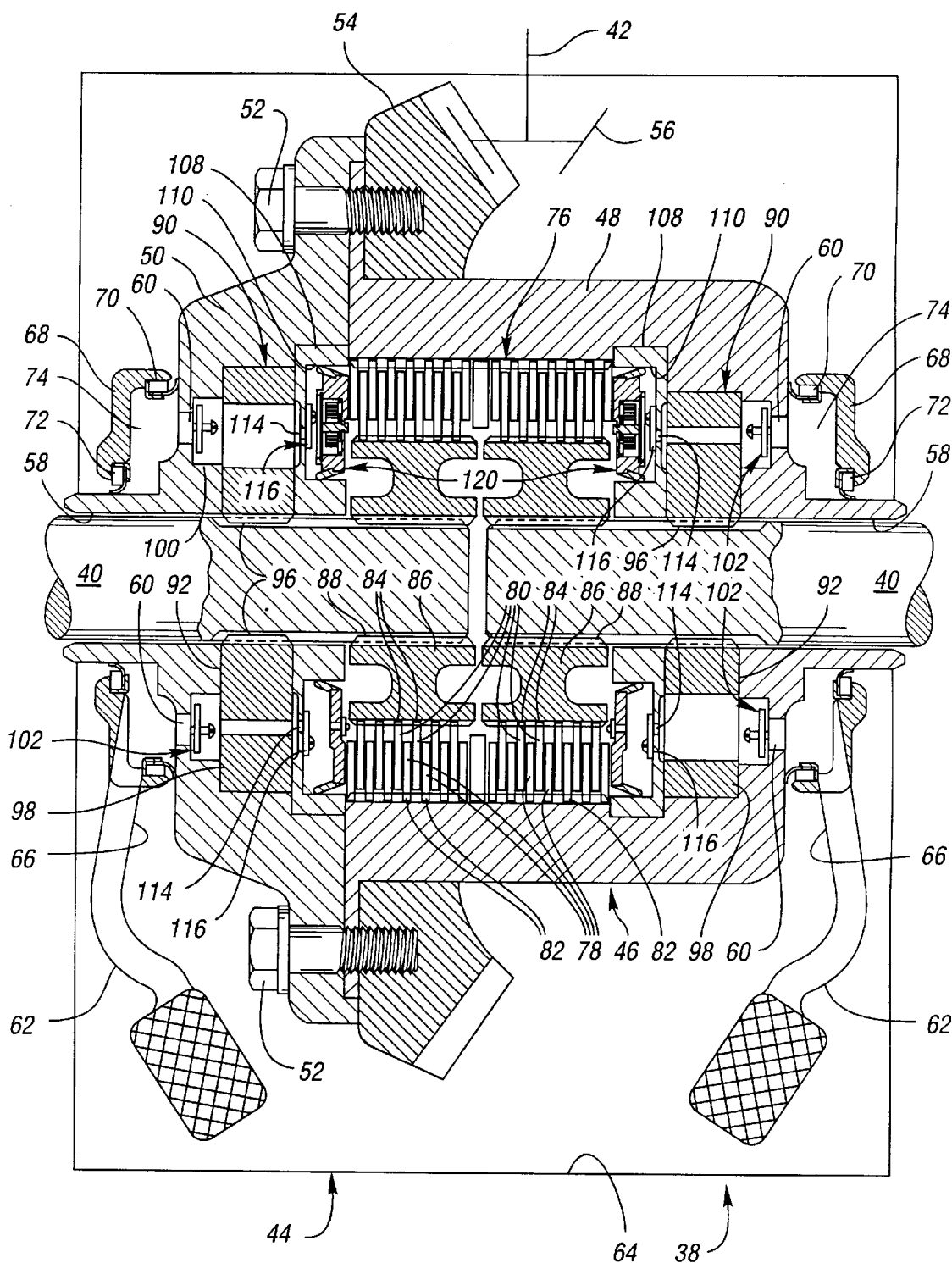
FIG. 2 is a sectional view taken along the direction of line 2—2 in FIG. 1 on an enlarged scale to further illustrate the construction of the hydraulic coupling.

With reference to FIG. 2, the hydraulic coupling 38 of this invention includes a housing 44 for containing hydraulic fluid. A casing 46 of the hydraulic coupling is rotatively mounted within the housing 44 about an axis A about which the axle half shafts 40 rotate. The casing 46 includes a cup-shaped member 48 and a cap member 50 that are secured to each other by circumferentially spaced bolts 52 that also secure a bevel gear 54 which is meshed with a bevel gear 56 connected to the interaxle connecting shaft 42.

The casing 46 has a pair of openings 58 through which the left and right axle half shafts 40 respectively project into the casing. Furthermore, the cup-shaped member 48 and the cap member 50 of the casing 46 include a pair of fluid inlets 60 respectively adjacent the pair of openings 58 of the casing. More specifically, the cup-shaped member 48 and the cap member 50 each includes a pair of the fluid inlets 60 for receiving hydraulic fluid upon pumping in opposite directions of rotation as is hereinafter more fully described. A pair of fluid pickup tubes 62 extend downwardly to adjacent a lower extremity 64 of the housing 46 to receive hydraulic fluid therefrom. Each pickup tube 62 has an upper end 66 supported by an annular member 68 having a pair of annular seals 70 and 72 that seal with the casing 48 to cooperatively define an annular space 74 for feeding the hydraulic fluid to the fluid inlets 60.

Figure 3:
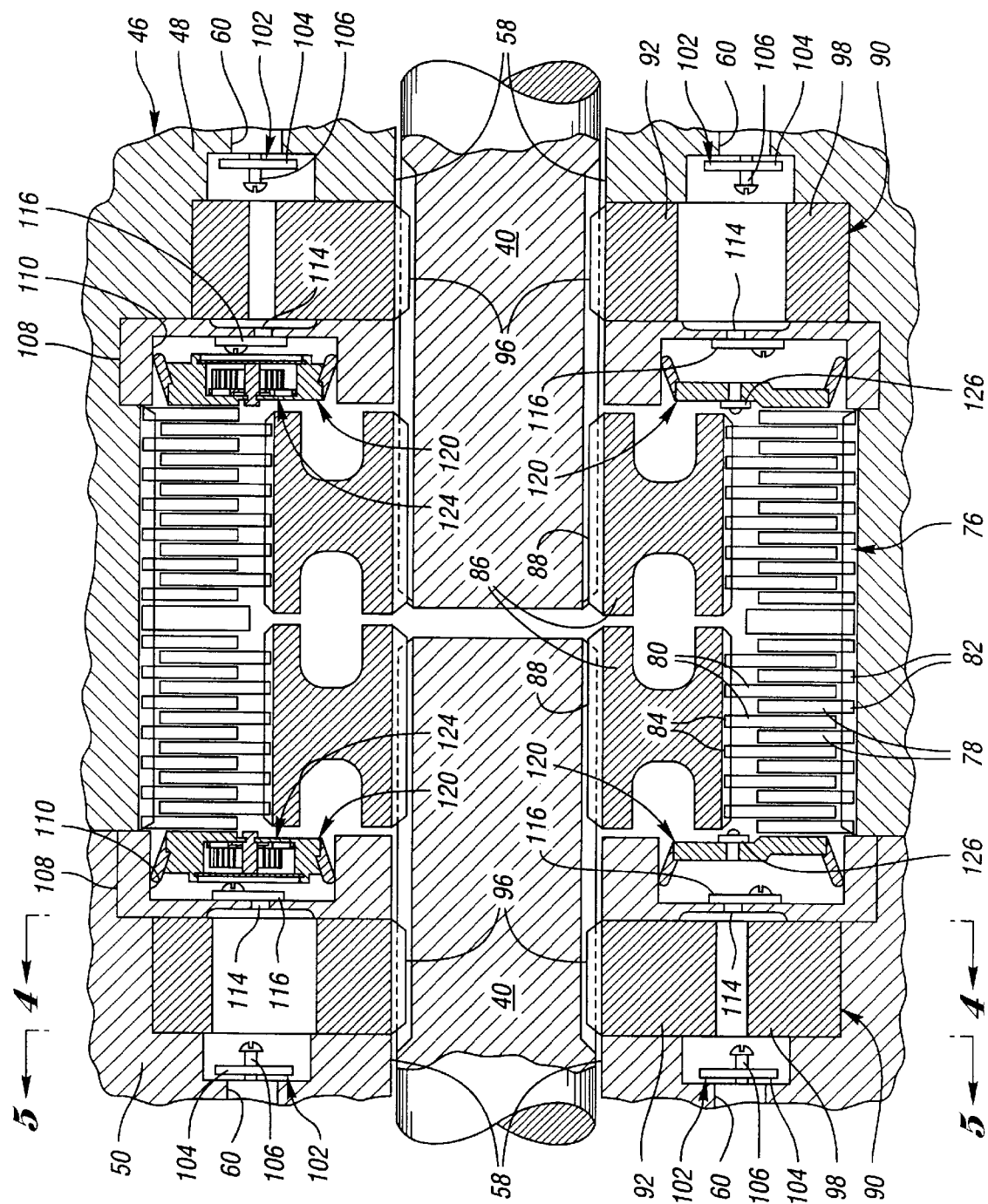
FIG. 3 is a view of a portion of FIG. 2 but taken on a further enlarged scale to further illustrate the construction of the hydraulic coupling.

With continuing reference to FIG. 2 and further reference to FIG. 3, the hydraulic coupling also includes a clutch 76 that is located within the cup-shaped member 48 of the casing 46 and extends between the casing and the left and right axle half shafts 40. More specifically, the clutch includes annular clutch plates 78 and 80 that respectively have outer and inner spline connections 82 and 84 to the casing 46 and to the outer extremity of a pair of left and right annular spline connectors 86. The left and right annular spline connectors 86 have respective inner spline connections 88 to the left and right axle half shafts 40 such that the clutch extends between the casing and the axle half shafts. Actuation of the clutch as is hereinafter described by clamping of the clutch plates 78 and 80 provides torque transfer between the casing 46 and one or both of the axle half shafts 40.

Figure 4:
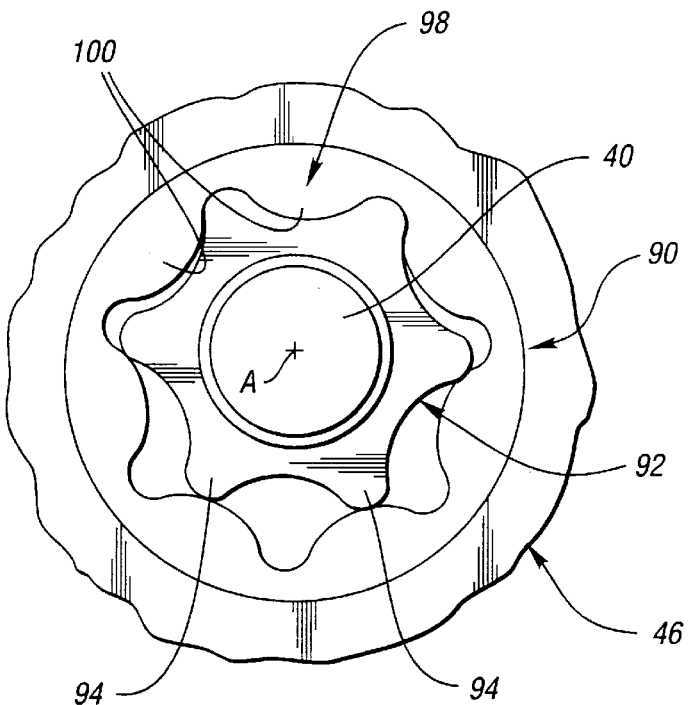
FIG. 4 is a view taken along the direction of line 4—4 of FIG. 3 to illustrate the construction of each of a pair of hydraulic pumps of the hydraulic coupling.
Figure 5:
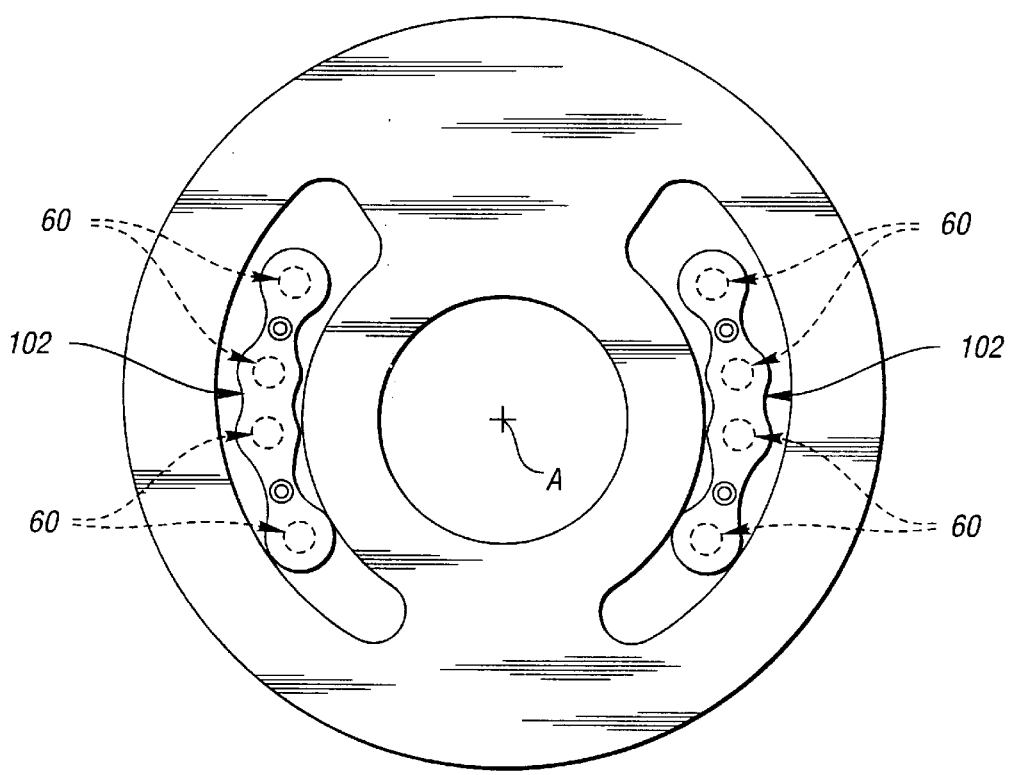
FIG. 5 is a view taken along the direction of line 5—5 of FIG. 3 to illustrate a pair of check valves associated with fluid inlets of the hydraulic coupling.

As illustrated in FIG. 2, the hydraulic coupling 38 includes a pair of hydraulic pumps 90 located within the casing 46 respectively within the cup-shaped member 48 adjacent the right end of the casing and within the cap member 50 adjacent the left end of the casing. Each pump 90, as illustrated in FIG. 4, includes an impeller 92 that has external teeth 94, and each impeller also has a spline connection 96 to the adjacent axle half shaft 40 as shown in FIG. 2. Each pump 90 as shown in FIG. 4 also has an internal ring gear 98 mounted within the casing eccentrically with respect to the impeller and including internal teeth 100 meshed with the external teeth 96 of the impeller 92. The impeller 92 has one less tooth than the ring gear 98 to provide a rotational pumping of hydraulic fluid into the casing through the adjacent inlet 60 upon relative rotation between the casing 46 and the associated axle half shaft 40.

As illustrated in FIG. 4, the impeller has six external teeth 96 and the internal ring gear 98 has seven internal teeth 100. This construction, as well as the impeller having five or seven teeth and the internal ring gear having six or eight teeth, respectively, provides sufficient pumping capacity without pressure surging; however, it should be appreciated that other numbers of teeth can also be utilized.

Figure 6:
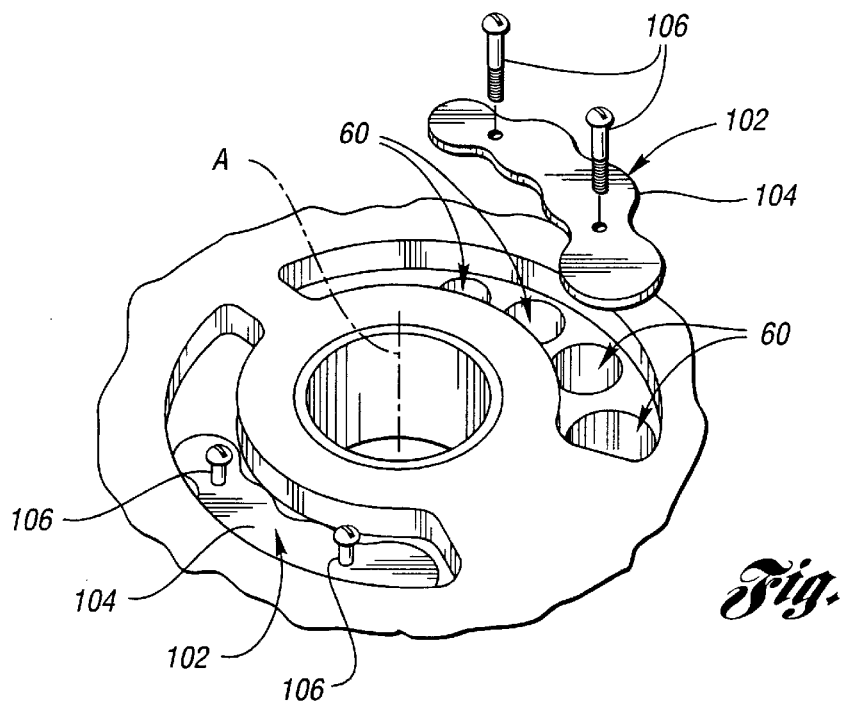
FIG. 6 is an exploded perspective view that further illustrates the construction of the check valves and inlets.

With combined reference to FIGS. 2 and 6, there are a pair of the inlets 60 adjacent each hydraulic pump at each end of the casing and each inlet includes a number of bores and an associated check valve 102 so as to permit the hydraulic fluid pumping into the casing to be performed in both directions of relative rotation, with one inlet open and the other closed during one direction of rotation and with the other inlet open and the one closed in the other direction of rotation. More specifically, each check valve 102 includes a thin valve element 104 that is mounted by guides such as the threaded bolts 106 shown for movement between a closed position adjacent the inlet 60 and an open position spaced from the associated inlet. Thus, during one direction of relative rotation of each axle half shaft 40 with respect to the casing 40, one of the check valves 102 will be closed and the other will be open and the reverse is the case in the other direction of relative rotation.

As illustrated in FIG. 2, the casing 46 includes a pair of inserts 108 respectively associated with each of the pair of hydraulic pumps 90. Each insert 108 as best illustrated in FIG. 3 defines an annular piston chamber 110 and also includes a pair of transfer ports 114. Each transfer port 114 has an associated check valve 116 of a leaf spring construction for permitting pressurized fluid to flow from the associated hydraulic pump 90 into the piston chamber 110 while preventing reverse flow in the opposite direction. During one direction of relative rotation between the casing and the associated axle half shaft, one of the transfer ports 114 is opened by its associated valve 116 to permit the pressurized hydraulic fluid to flow into the piston chamber 110 while the other transfer port 114 is closed by its associated valve 116. The relative open and closed position of these transfer ports is reversed during the other direction of relative rotation between the casing and the associated axle half shaft.

With continuing reference to FIG. 3, the pair of piston chambers 110 are defined by the inserts 108 within the casing and are respectively located on opposite sides of the clutch 76 to receive hydraulic fluid pumped from the pair of pumps 90 as previously described through the transfer ports 114 in association with their valves 116.

A pair of annular pistons 120 of the hydraulic coupling are respectively received as shown in FIG. 3 within the piston chambers 110. Hydraulic fluid pumped from the hydraulic pumps 90 pressurizes the piston chambers 110 and the pistons 120 are moved by the pumped hydraulic fluid to engage the clutch 76 in order to actuate the clutch and transfer torque between the casing 46 and one or both of the axle half shafts 40.

As illustrated by combined reference to FIGS. 2, 3, and 7–10, each piston 120 includes an outlet port 122 having a flow area through which the pumped hydraulic fluid flows from the associated piston chamber. Each outlet port 122 has a temperature compensated valve 124 that, as is hereinafter more fully described, decreases the flow area of the outlet port upon increasing temperature and that increases the flow area of the outlet port upon decreasing temperature to control the flow of pumped hydraulic fluid from the associated piston chamber and thereby control the torque transfer between the casing and one or both of the axle half shafts.

As illustrated in FIGS. 2, 3, 11 and 12, the hydraulic coupling also includes a pair of pressure relief valves 126 that respectively limit the hydraulic fluid pressure within the pair of piston chambers 110.

Figure 7:
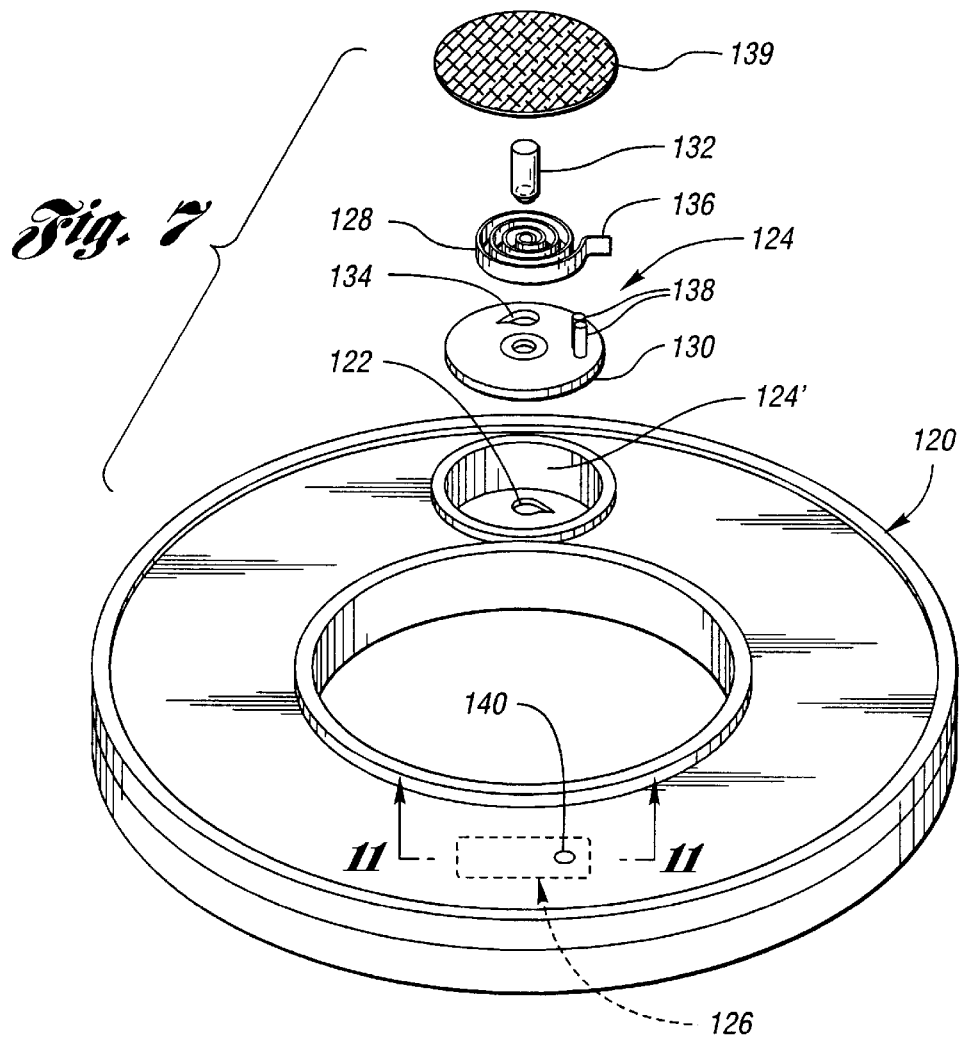
FIG. 7 is an exploded perspective view illustrating the construction of a temperature compensated valve and a pressure relief valve of the coupling.
Figure 8:
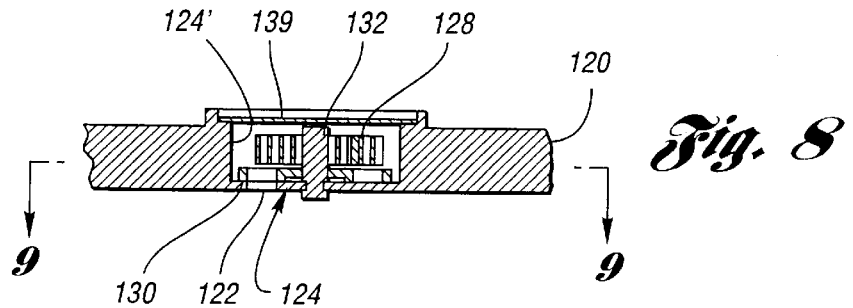
FIG. 8 is a sectional view that further illustrates the assembled construction of the temperature compensated valve.
Figures 9, 10:
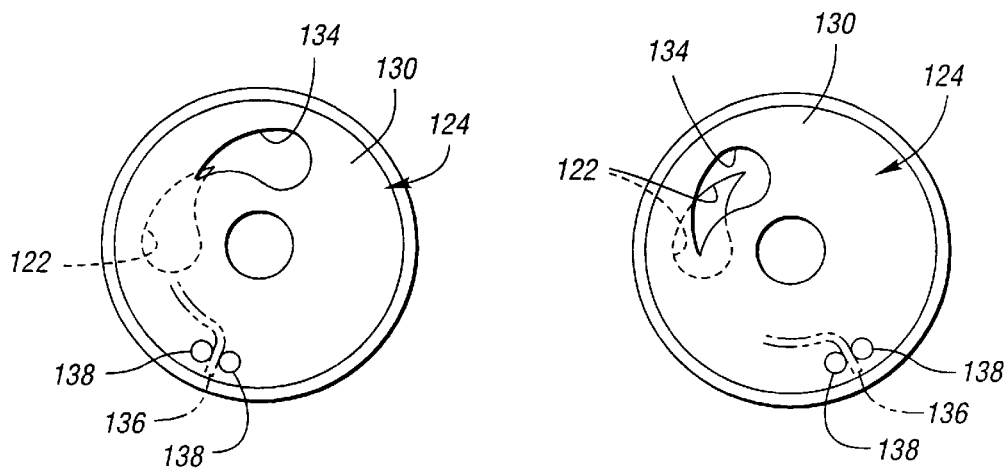
FIG. 9 is a view taken along the direction of line 9—9 in FIG. 8 to illustrate the construction of the temperature compensated valve during hot operation where it is closed relative to cold operation.
FIG. 10 is a view similar to FIG. 9 but illustrating the temperature compensated valve during cold operation where it is more open than in the hot operation.

As best illustrated in FIG. 7, each outlet port 122 extends through the associated piston 120 on which the associated temperature compensated valve 124 is mounted. As shown in FIGS. 9 and 10, each outlet port 122 has a teardrop shape. Each temperature compensated valve 124 has a bimetallic spring 128 and a valve element 130 that is rotatably mounted on a piston-mounted post 132. Each valve element 130 has a teardrop-shaped opening 134 whose alignment with the outlet port 122 is controlled by the rotational positioning of the valve element by the bimetallic spring 128 whose outer end 136 engages a pair of posts 138 on the valve element. Thus, for hotter operating temperatures where the hydraulic fluid is less viscous, the valve 124 moves toward the less open position as shown in FIG. 9, while colder temperatures cause the valve to open as shown in FIG. 10 as the pointed ends of the teardrop-shaped outlet port 122 and the valve element opening 134 move relative to each other. Also, a filter 139 encloses the valve components within a valve recess 124' in the piston 120 as best shown in FIGS. 7 and 8.

Figure 11:
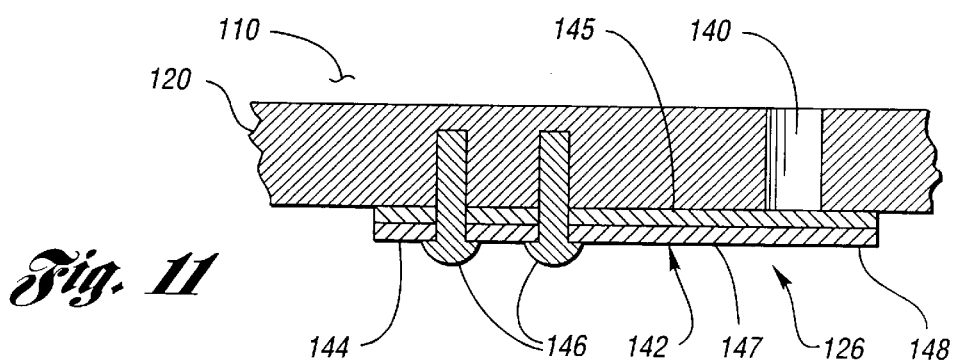
FIG. 11 is a sectional view taken along the direction of line 11—11 in FIG. 7 to illustrate the construction of a pressure relief valve which is shown in its closed position.
Figure 12:
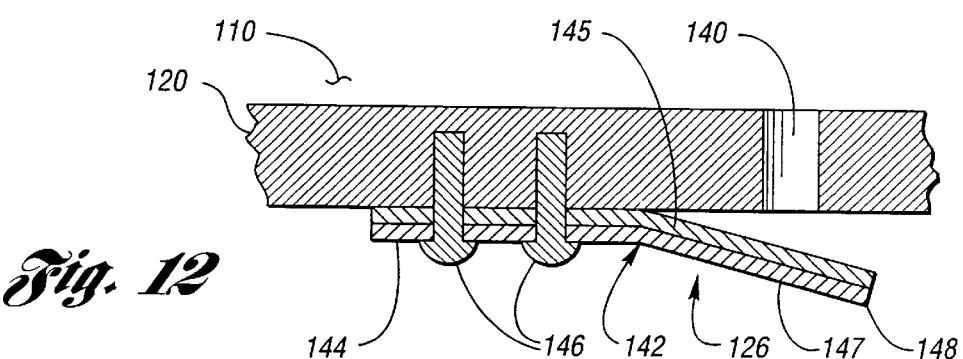
FIG. 12 is a view similar to FIG. 10 showing the pressure relief valve in its open position to relieve fluid pressure and thereby limit torque transfer between the casing and the axle half shafts through the hydraulic coupling.

As best illustrated in FIGS. 11 and 12, each pressure relief valve 126 includes a pressure relief port 140 that extends through the associated piston, and each pressure relief valve includes a valve element 142 on the opposite side of the piston 120 from the piston chamber 110. More specifically, the valve element 142 has one end 144 mounted such as by fasteners 146 on the piston and has a distal end 148 that closes the pressure relief port 140 until a threshold pressure is reached in the associated piston chamber. The valve element end 148 then moves to the open position illustrated in FIG. 12 to open the pressure relief valve and permit flow through the pressure relief port 140.

Figure 15:
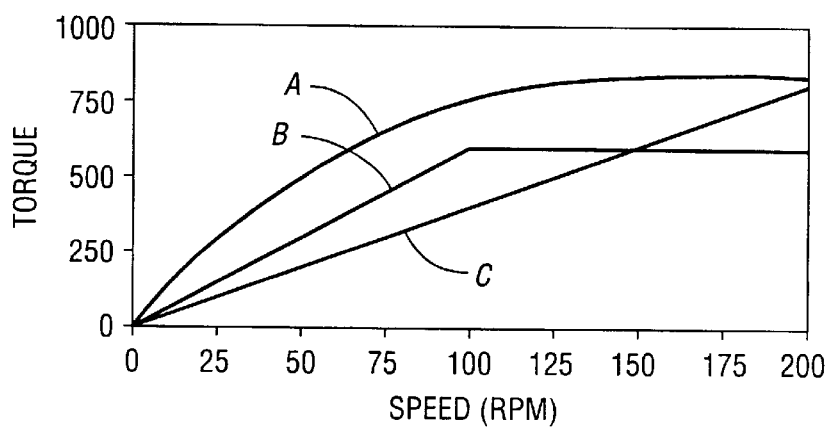
FIG. 15 is a graph illustrating torque transfer versus the speed of relative rotation between a casing of the coupling and one of the axle half shafts.

The pressure relieve valve construction illustrated in FIGS. 11 and 12 will normally be utilized to provide a progressive pressure relieve as illustrated by torque curve A in FIG. 15. Such constructions will have a relatively small size of the pressure relief port 140 and the valve opening will commence almost immediately with a continual increase throughout the increasing difference in relative rotational speed between the casing and the associated axle half shaft or shafts. Also, the valve element 142 has a bimetallic construction including separate metallic layers 145 and 147 so the progressive pressure relief is temperature compensated, i.e. the valve element end 148 moves toward the port 140 at hotter temperatures and away from the port at colder temperatures. Thus, at hotter temperatures there is a smaller flow area and at colder temperatures there is a larger flow area so the temperature does not affect the progressive pressure relief.

Figure 13:
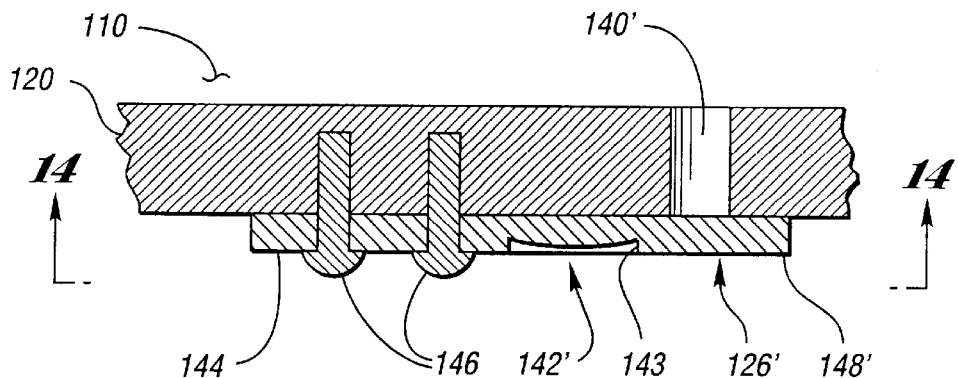
FIG. 13 is a section view similar to FIG. 11 of another embodiment of the pressure relief valve.
Figure 14:
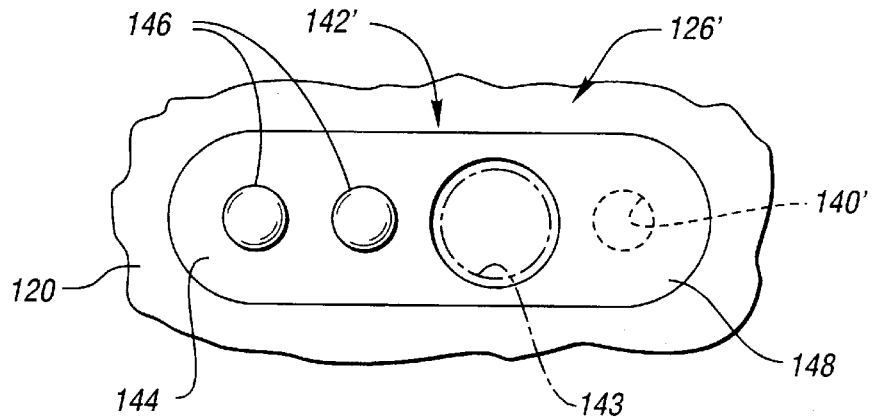
FIG. 14 is a plan view of the further valve embodiment taken along line 14—14 of FIG. 13.

As illustrated in FIGS. 13 and 14, another embodiment of the pressure relieve valve 126' has the same construction as the previously described pressure relief valve but has its valve element 142' formed with an indentation 143 that provides a snap action opening at a predetermined level of pumped fluid pressure corresponding to a corresponding differential speed of rotation between the casing and the associated axle half shaft. Such operation is illustrated by the torque curve B illustrated in FIG. 15. Once the threshold pressure is exceeded, this valve will have a hysteresis and stay fully open even at pressure levels immediately below the threshold pressure level. The pressure relief effect of this valve can be increased by providing a larger size of the pressure relief port 140'.

As also illustrated in FIG. 15, the hydraulic coupling can operate along a linear speed/torque line C when no pressure relief valve is utilized.

While the best modes for carrying out the invention have been described in detail, those familiar with the art to which this invention relates will recognize various alternative designs and embodiments for practicing the invention as defined by the following claims.

What is claimed is:

1. A hydraulic coupling for coupling a pair of axle half shafts of an auxiliary drive axle of a vehicle drivetrain having a main drive axle and a connecting shaft extending between the auxiliary and main drive axles, the coupling comprising:

a housing for containing hydraulic fluid;

a casing rotatively mounted within the housing and rotatively driven by the main axle through the connecting shaft, the casing having a pair of openings through which the pair of axle half shafts respectively project into the casing, and the casing including a pair of fluid inlets respectively adjacent the pair of openings;

a clutch that extends between the casing and each of the axle half shafts within the casing, and the clutch being actuable to transfer torque between the casing and each of the pair of axle half shafts;

a pair of hydraulic pumps located within the casing respectively adjacent the pair of fluid inlets with the clutch located between the pair of pumps, each pump including an impeller that has external teeth and also has a spline connection to an associated one of the axle half shafts, each pump also having an internal ring gear mounted for rotation eccentrically with respect to the impeller and including internal teeth meshed with the external teeth of the impeller, the impeller having one less tooth than the ring gear to provide a rotational pumping of hydraulic fluid into the casing through the adjacent inlet upon relative rotation between the casing and the associated axle half shaft;

a pair of piston chambers defined within the casing and respectively located on opposite sides of the clutch to receive hydraulic fluid pumped from the pair of pumps;

a pair of pistons respectively located within the pair of piston chambers and being movable by pumped hydraulic fluid to actuate the clutch and transfer torque between the casing and at least one of the axle half shafts; and each piston chamber including an outlet port having a flow area through which the pumped hydraulic fluid flows, and each outlet port having a temperature compensated valve that decreases the flow area of the outlet port upon increasing temperature and that increases the flow area of the outlet port upon decreasing temperature to control the flow of pumped hydraulic fluid from the associated piston chamber and thereby control the torque transfer between the casing and the axle half shafts.

2. A hydraulic coupling as in claim 1 wherein each outlet port extends through the associated piston on which the associated temperature compensated valve is mounted.

3. A hydraulic coupling as in claim 2 wherein each outlet port has a teardrop shape, each temperature compensated valve having a bimetallic spring and a valve element that is rotatively moved by the bimetallic spring in response to temperature changes, and each valve element having a teardrop-shaped opening that is moved with respect to the associated outlet port to control the flow area of the outlet port and thus the flow of pumped hydraulic fluid through the outlet.

4. A hydraulic coupling as in claim 1 further including a pair of pressure relief valves that respectively limit the hydraulic fluid pressure within the pair of piston chambers.

5. A hydraulic coupling as in claim 4 wherein each pressure relief valve includes a pressure relief port that extends through the associated piston, and each pressure relief valve including a valve element mounted on the associated piston for movement between closed and open positions.

6. A hydraulic coupling as in claim 5 wherein the valve element of each pressure relief valve comprises an elongated valve element having one end mounted by the associated piston and having a distal end that closes the pressure relief port until a predetermined pressure is reached in the associated piston chamber whereupon the valve element moves to the open position to open the pressure relief valve.

7. A hydraulic coupling as in claim 4 wherein each pressure relief valve is constructed to relieve pressure progressively.

8. A hydraulic coupling as in claim 4 which includes a bimetallic valve element that relieves pressure in a progressive manner that is temperature compensated.

9. A hydraulic coupling as in claim 4 wherein each pressure relief valve is constructed to relieve pressure with a snap action and hysteresis.

10. A hydraulic coupling for coupling a pair of axle half shafts of an auxiliary drive axle of a vehicle drivetrain having a main drive axle and a connecting shaft extending between the auxiliary and main drive axles, the coupling comprising:

a housing for containing hydraulic fluid;

a casing rotatively mounted within the housing and rotatively driven by the main axle through the connecting shaft, the casing having a pair of openings through which the pair of axle half shafts respectively project into the casing, and the casing including a pair of fluid inlets respectively adjacent the pair of openings;

a clutch that extends between the casing and each of the axle half shafts within the casing, and the clutch being actuable to transfer torque between the casing and each of the pair of axle half shafts;

a pair of hydraulic pumps located within the casing respectively adjacent the pair of fluid inlets with the clutch located between the pair of pumps, each pump including an impeller that has external teeth and also has a spline connection to an associated one of the axle half shafts, each pump also having an internal ring gear mounted for rotation eccentrically with respect to the impeller and including internal teeth meshed with the external teeth of the impeller, the impeller having one less tooth than the ring gear to provide a rotational pumping of hydraulic fluid into the casing through the adjacent inlet upon relative rotation between the casing and the associated axle half shaft;

a pair of piston chambers defined within the casing and respectively located on opposite sides of the clutch to receive hydraulic fluid pumped from the pair of pumps;

a pair of pistons respectively located within the pair of piston chambers and being movable by pumped hydraulic fluid to actuate the clutch and transfer torque between the casing and at least one of the axle half shafts; and each piston including an outlet port having a flow area through which the pumped hydraulic fluid flows from the associated piston chamber, and each outlet port having a temperature compensated valve that is mounted on the associated piston and operable to decrease the flow area of the outlet port upon increasing temperature and that is operable to increase the flow area of the outlet port upon decreasing temperature to control the flow of pumped hydraulic fluid from the associated piston chamber and thereby control the torque transfer between the casing and the axle half shafts.

\* \* \* \* \*